US008694799B2

(12) United States Patent
Bauchot et al.

(10) Patent No.: US 8,694,799 B2
(45) Date of Patent: **\*Apr. 8, 2014**

(54) SYSTEM AND METHOD FOR PROTECTION OF CONTENT STORED IN A STORAGE DEVICE

(75) Inventors: Frederic Bauchot, Saint-Jeannet (FR); Jean-Luc Collet, La Gaude (FR); Gerard Marmigere, Drap (FR); Christophe Mialon, Vence (FR)

(73) Assignee: International Business Machines Corporation, Armonk, NY (US)

( * ) Notice: Subject to any disclaimer, the term of this patent is extended or adjusted under 35 U.S.C. 154(b) by 1015 days.

This patent is subject to a terminal disclaimer.

(21) Appl. No.: 12/195,638

(22) Filed: Aug. 21, 2008

(65) Prior Publication Data

US 2009/0052672 A1     Feb. 26, 2009

(30) Foreign Application Priority Data

Aug. 24, 2007  (EP) ..................................... 07301325

(51) Int. Cl.
*G06F 11/30*     (2006.01)
*G06F 12/14*     (2006.01)

(52) U.S. Cl.
USPC .......................................... 713/193; 380/287

(58) Field of Classification Search
USPC ........... 455/405; 719/220; 726/4, 9; 713/168, 713/176, 186, 155, 161, 177, 189, 193; 380/217, 228; 705/75; 382/124, 115, 382/264; 711/163; 365/200
See application file for complete search history.

(56) References Cited

U.S. PATENT DOCUMENTS 5,796,824 A     8/1998  Hasebe et al.
5,920,560 A     7/1999  Takahashi et al.
(Continued)

FOREIGN PATENT DOCUMENTS

EP     1 195 734 A1    4/2002
EP     1505595 A2      2/2005
(Continued)

OTHER PUBLICATIONS

Benjamin C. Reed; Authenticating Network Attached Storage; Jun. 6, 2003; IEEE; pp. 1-9.*

(Continued)

*Primary Examiner* — Mohammad W Reza
*Assistant Examiner* — Monjour Rahim
(74) *Attorney, Agent, or Firm* — Douglas A. Lashmit; Hoffman Warnick LLC (57) ABSTRACT

The invention provides a system and method for content protection. A system according to an embodiment includes a media center connectable to a mobile secure and protection keyring associated with an identifier and with a media Key block MKB. The media center includes: a unique identifier identifying the media center MC_UID, a set of device keys DK; storage means for storing files identified by respective file identifiers; and a processing unit comprising file encryption means for encrypting each file before storage in the storage means, using a title key (Kt) computed from the identifier MC_UID of the media center and for encrypting the title key Kt from the set of device keys DK of the media center, and from the identifier and the media key block MKB of the mobile secure and protection keyring, the media center being further provided to write the encrypted title key (eKt) in association with the file identifier of the file to the mobile secure and protection keyring.

17 Claims, 7 Drawing Sheets

(56) References Cited

U.S. PATENT DOCUMENTS

| | | | |
|---|---|---|---|
| 6,853,731 B1* | 2/2005 | Boyle et al. | 380/268 |
| 7,136,487 B1 | 11/2006 | Schon et al. | |
| 7,765,373 B1* | 7/2010 | Merry et al. | 711/163 |
| 7,805,607 B2* | 9/2010 | Diehl et al. | 713/168 |
| 2003/0074569 A1* | 4/2003 | Yamauchi et al. | 713/189 |
| 2003/0217271 A1 | 11/2003 | Calder | |
| 2005/0234826 A1* | 10/2005 | Ohmori et al. | 705/51 |
| 2007/0160209 A1* | 7/2007 | Kasahara et al. | 380/217 |
| 2007/0223705 A1 | 9/2007 | Kasahara et al. | |
| 2008/0072072 A1* | 3/2008 | Muraki et al. | 713/193 |
| 2008/0152137 A1* | 6/2008 | Nakano et al. | 380/201 |

FOREIGN PATENT DOCUMENTS

| | | |
|---|---|---|
| EP | 1 764 697 A1 | 3/2007 |
| WO | 0131839 | 5/2001 |
| WO | 2006001161 | 1/2006 |

OTHER PUBLICATIONS

Goyal et al., "Attribute-Based Encryption for Fine-Grained Access Control of Encrypted Data", IEEE, 2006, pp. 1-26.

Soliman, International Application No. PCT/EP2008/057346, Search Report and Written Opinion of the International Searching Authority, Aug. 10, 2008, 15 pages.

Intel Corporation, "Content Protection for Recordable Media Specification; SD Memory Card Book Common Part", Revision 0.961, XP-002495304, May 3, 2007, 36 pages.

Intel Corporation, "Content Protection for Recordable Media Specification; SD Memory Card Book SD-SD Part", Revision 0.9, XP-002495305, May 15, 2007, 69 pages.

Intel Corporation, "Content Protection for Recordable Media Specification; SD Memory Card Book SD-Audio Part", Revision 0.97, XP-002495306, Feb. 22, 2007, 20 pages.

Intel Technology Journal, "Interoperable Home Infrastructure; Content Protection in the Digital Home", Nov. 15, 2002, Issue 04, vol. 06, 1 page.

Dipert, "Media Security Thwarts Temptation, Permits Prosecution", TechTrends, Jun. 22, 2000, pp. 101-118.

Rahim, U.S. Appl. No. 12/195,598, Office Action Communication, FR920070038US1, Mar. 30, 2011, 16 pages.

Rahim, U.S. Appl. No. 12/195,598, Office Action Communication, FR920070038US1, Aug. 19, 2011, 11 pages.

Marc Bichler, "EPO Office Action", Application No. 08 760 893.1, Dated: Oct. 4, 2010, 5 pages.

XP-00299134, "Content Protection for Recordable Media Specification", DVD Book, Jan. 31, 2003, 50 pages.

Rahim, U.S. Appl. No. 12/195,598, Office Action Communication, FR92007038US1, Jul. 16, 2013, 16 pages.

Rahim, U.S. Appl. No. 12/195,598, Notice of Allowance & Fees Due, FR92007038US1, Nov. 12, 2013, 13 pages.

\* cited by examiner

SYSTEM AND METHOD FOR PROTECTION OF CONTENT STORED IN A STORAGE DEVICE

FIELD OF THE INVENTION

The present invention generally relates to protection of content stored on a storage device. The invention relates more specifically to a method and system for protecting data stored on a storage device against unauthorized access or use, based on encryption of the data before storage.

BACKGROUND ART

As the volume of data stored on personal computers becomes more and more important, external mobile storage devices, having portable and large capacity storage features, are provided to serve as auxiliary storage means. Such conventional storage devices are generally referred to as external hard disks, media disks, or media centers, and are connectable to personal computers for data transfer between the personal computer and the external storage device. They are usually used to store personal data such as pictures, audio and video files.

As is well known, these storage devices can be directly attached to a display device or a player so as to readily display or play the data stored in the storage device, for example when the data are of video, audio or picture type.

The existing storage devices allow mobility/portability of the content, so that the content is no longer only bound to the specific personal computer to which it was originally downloaded or received in another way.

However, the data stored are more vulnerable in the storage device than when they are stored in the personal computer. Indeed, the existing storage devices are generally deprived of content protection. Their small size further exposes them to risks of robbery. Accordingly, the content of the storage devices might be fraudulently copied or erased.

In the same time, the data stored in the storage devices tend to become more and more personal. Therefore, another concern with such storage devices is to ensure that only authorized users may access the data stored, and in particular that the access authorization be provided by the master user to which the storage device belongs.

There exist systems and methods widely implemented to protect content stored on external storage devices. These existing systems lie on complex processing of data and/or on complex identification infrastructure, such as password-based or biometrics identification infrastructures, or on external authorization entities, such as a commercial server using a trusted party. Such approaches involve important costs and complex interactions with the users. They are also reliant on user remembering passwords or identification information.

There exist other systems and methods called CPRM (Content Protection for Recordable media) and AACS (Advanced Access Content System) that control copying, moving, and deletion of digital media on a host device, such as a personal computer, or other digital player. These systems rely on key management for interchangeable media, content encryption, and media-based renewability. They involve a number of entities interacting in a commercial infrastructure for ensuring protection of content and providing access authorizations to other users (content owner, clearing house, content reseller, client). These systems are quite complex and provide a non-personal solution.

SUMMARY OF THE INVENTION

The present invention provides a system and method for content protection. A system according to the invention comprises a master storage device connectable to a mobile master memory unit associated with a memory unit identifier and with a set of memory unit keys. The storage device comprises: a unique device identifier identifying the device; a set of protection keys; storage means for storing files identified by respective file identifiers; and a processing unit comprising file encryption means for encrypting each file before storage in the storage means, using a title key Kt computed from the device identifier of the storage device and for encrypting the title key Kt from the set of protection keys of the storage device, the memory unit identifier and the set of memory unit keys of the master memory unit. The master storage device is further provided to write the encrypted title key in association with the file identifier of the file to the master memory unit.

The invention thus allows local encryption of any kind of file, such as a video file, using a generated title key, and local generation of an encrypted title key for a locally encrypted file.

The title key, which is the original content encryption key according to the invention, is never stored anywhere as such. It is generated once, using the unique identifier of the storage device and a randomly generated number, for encryption of a given file. The title key is then encrypted using parameters which are preferably burnt and protected. The resulting encrypted title key is stored on the master memory unit and will have to be subsequently decrypted for decryption of the corresponding encrypted file to allow an operation such as a playing operation on that file.

The invention does not rely on any external entity such as a commercial server using a trusted party or another storage device for the generation of the title key, thereby providing a personal solution.

The invention even prevents the generation of an encrypted title key for a title key which has been generated on another site by an external entity (e.g., a commercial server using a trusted party or another storage device). Indeed, according to an aspect of the invention, a part of the title key is a signature which uniquely identifies the media center which generated the title key. The generation of the encrypted title key is allowed only if the signature part corresponds to the storage device identification.

In particular, the invention is compatible with a CPRM or AACS-based content distribution system.

The present invention thus ensures protection of data stored on the storage device against unauthorized access and viewing, and unauthorized copy.

With the invention, the user only needs to be provided with at least two separate components, the mobile memory unit and the storage device, and to connect these components: initially, to enable encryption of the files (copy with encryption); and subsequently, to authorize decryption of the files for operation on the files, such as a playing operation.

The invention thus provides a solution which is secure, reliable, personal, and easy-to-use.

The invention obviates the need for passwords or identification sessions. The solution is based on security keys that can be transferred to somebody else if the master user decides and agrees to do so.

Further, the solution of the invention is not entirely resident on a personal computer or on the storage device itself, but is split between different components, one of which is removable and mobile.

With the solution of the invention, it is possible to first encrypt a given file in a first storage device using a mobile memory unit for storage of the encryption information, and then securely copy the same encrypted file to multiple different media centers, and subsequently use this mobile memory unit to provide access to this given encrypted file at any of the different media centers.

Further advantages of the present invention will become clear to the skilled person upon examination of the drawings and detailed description. It is intended that any auxiliary advantages be incorporated herein.

BRIEF DESCRIPTION OF THE DRAWINGS

Embodiments of the present invention will now be described by way of non-limiting example with reference to the accompanying drawings in which like references denote similar elements.

DETAILED DESCRIPTION OF THE INVENTION

The drawings are intended to depict only typical embodiments of the invention, and therefore should not be considered as limiting the scope of the invention. Additionally, the detailed description is supplemented with an Exhibit E1 containing examples of equations used by the system and the method according to the invention. In the foregoing description, references to Exhibit E1 are made directly using the Exhibit identifier "E1". Exhibit E1 is placed apart for the purpose of clarifying the detailed description, and of enabling easier reference. In Exhibit E1, some equations involve functions of the types "encrypt(A,B)" and "decrypt(A,B)", each having two parameters A and B. In these equations, the first parameter A will represent the object that is to be encrypted or decrypted and the second parameter will represent B the key used for the encryption.

Figure 1:
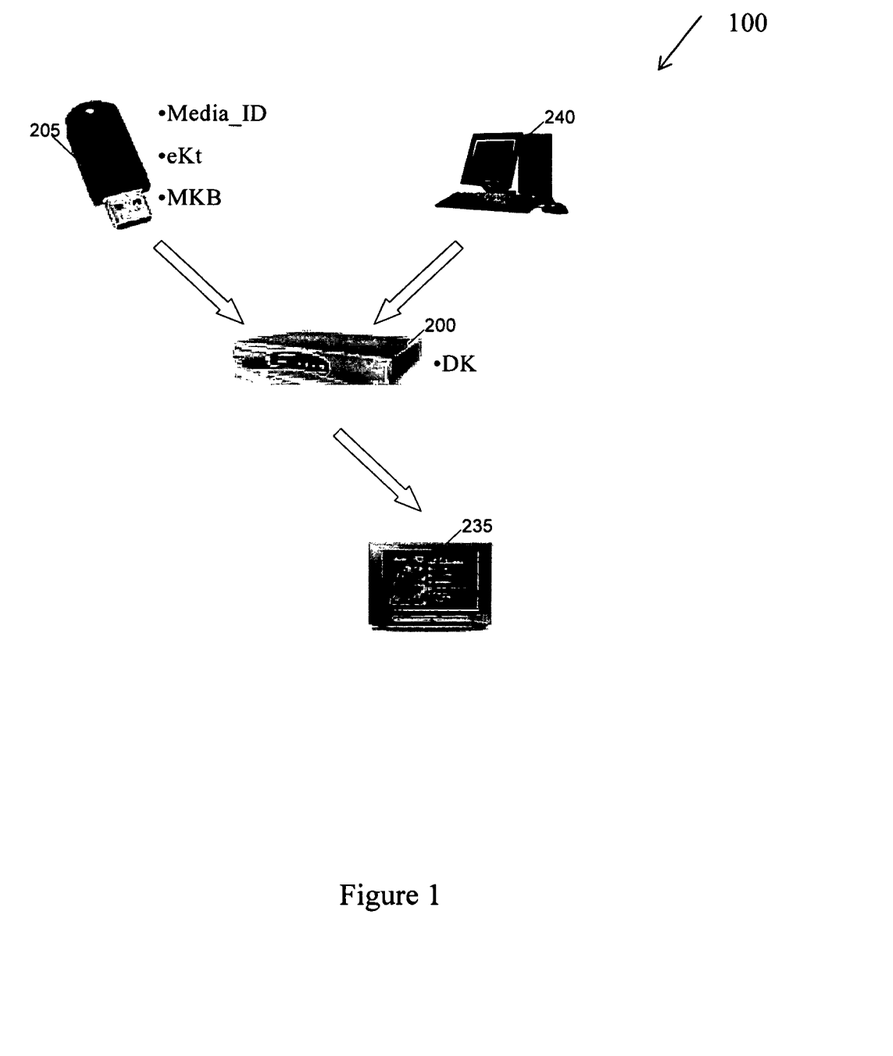
FIG. 1 shows a block diagram of a content protection system according to the invention.

Reference is first made to FIG. 1 showing the general structure of a content protection system 100, according to the invention.

The system 100 according to the invention comprises a storage device 200 having storage means for storing files, for example audio, video or picture files. The storage device includes devices of external hard disk type, but may also comprise logic functions such as playing/recording function. The following description will be made in reference to a storage device 200 capable of storing and playing video files that will be referred to as a "media center" hereinafter, for illustrative purposes only.

The media center 200 has connection means for connection to a mobile memory unit 205 which will be called below "Mobile Securing Protection keyring" or "MSP keyring". The MSP keyring 205 is a removable memory unit having storage capacity and being connectable to the media center through any suitable connection means, and may be in particular a memory unit of small size, which takes little place, such as a USB key as shown, a SD card or even a DVD-RW, so that a user may readily carry it.

The media center 200 has reading and writing capabilities for reading data from the MSP keyring and writing data on it.

FIG. 1 shows a MSP keyring 205 of the type USB directly connected to the media center 200 through a USB connector. However, one skilled in the art will understand that the MSP keyring 205 could be alternatively indirectly connected through a Personal Computer connected to the media center.

The system according to the invention makes it possible to split the protection information between the media center 200 and the removable MSP keyring 205, upon encryption of the files by the media center 200. The user will have to reconnect the same MSP keyring to the media center 200 or a different MSP keyring with valid licenses for access or operation on the files. The user will have to reconnect the same MSP keyring to the media center 200 for access or operation on the files. More specifically, the MSP keyring 205 stores encryption data related to some or all of the encrypted files stored onto the media center 200.

The MSP keyring 205 has: a memory unit identifier media_id identifying the MSP keyring; and a set of memory unit keys thereinafter called media Key Block or MKB.

According to a particular aspect of the invention, the identifier media_id of the MSP keyring 205 is burnt to the MSP keyring, at manufacturing time. This identifier will be used to cryptographically bind the content encrypted by the media center 200 to the MSP keyring 205 in order to prevent fraudulent access or copying to other storage devices.

The media Key Block will be used to calculate an auxiliary key Km also called below media Key. The media Key Block may be burnt to the MSP keyring 205 at manufacturing time.

In an embodiment of the invention, the MSP keyring 205 is CPRM (Content Protection for Recordable media) or AACS (Advanced Access Content System) compliant. In such embodiment, the manufacturer of the MSP keyring 205 is provided with the media key block MKB by the 4C entity, LLC for CPRM, and by the AACS-LA (Advanced Access Content System Licensing Administrator) for AACS.

A personal computer 240 containing the original files at a non-encrypted state may be connected to the media center 200 for receiving commands from the user.

Monitoring of the media center 200 may be done by the external personal computer 240, or alternatively by a monitoring module included in the media center itself.

The media center 200 may be further provided with a plug for connection to a display such as a TV monitor 235 for video display, when the media center is of video/recorder type.

Figure 2:
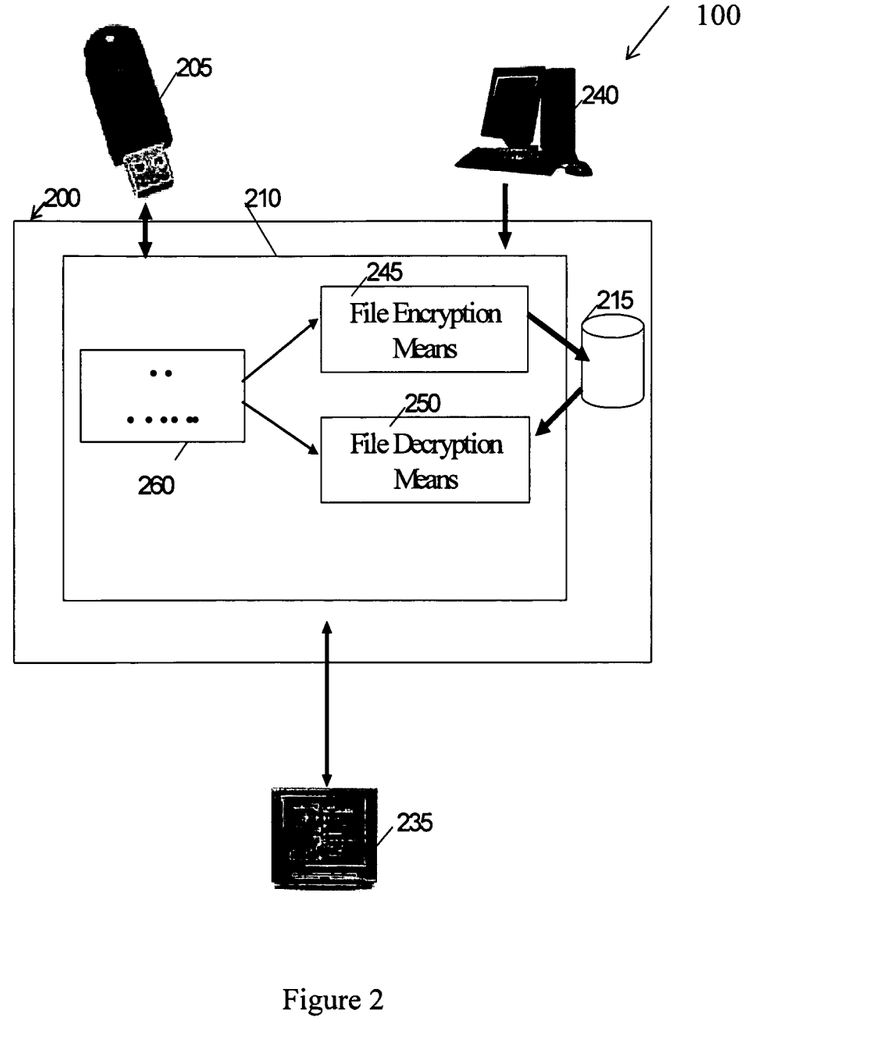
FIG. 2 is a block diagram showing the general architecture of a storage device according to the invention.

FIG. 2 shows the structure of the media center 200 with its storage means 215 for storing files, i.e., video files, received at an input. Prior to storing, the media center 200 ensures encryption of the input files according to the invention.

The storage device 200 further comprises a processing unit 210. The processing unit 210 may be implemented as a hardware chip or in a software form. The description will be made with reference to a hardware implementation of the invention, for illustrative purposes only.

The media center 200 comprises parameters 260, preferably burnt to the hardware, including: a set of protection keys also called device keys DK used for calculation of the media Key Km; and a unique device identifier MC_UID, identifying the media center 200.

According to an aspect of the invention, the set of secret device keys DK and the media identifier MC_UID are burnt to the media center 200, at manufacturing time, so as to be unreadable externally. The manufacturer will preferably be provided with the device Keys DK by the 4C Entity, LLC for CPRM, or by the AACS-LA for AACS in order to be CPRM or AACS compliant.

The media center identifier MC_UID is a unique identifier, generated at manufacturing time, which identifies the media center 200. The unique identifier MC_UID is attached to the media center so as to be non visible externally. In particular, the media identifier MC_UID is burnt and hidden in the hardware of the media center.

The processing unit 210 includes file encryption means 245 for encrypting the files received before storage in the storage means and file decryption means 250 for decrypting files from the storage means for which an operation such as a playing operation is required. In the hardware embodiment of the processing unit 210, the encryption and decryption means are included in the hardware.

Each file that is to be stored is associated with a file identifier file_id identifying the file.

The file encryption means 245 according to the invention encrypt each file using a key named title key Kt generated from the unique media identifier MC_UID and from a randomly generated number.

The title key Kt as such is never stored anywhere after encryption. Instead an encrypted title key is computed for storage in the MSP keyring 205 in association with the corresponding file identifier.

More specifically, the file encryption means 245 are adapted to encrypt each title key Kt using a hashing of the identifier media_Id of the MSP keyring 205 concatenated with the auxiliary key Km obtained from the device keys DK attached to the media center 200 and the media key block MKB attached to the MSP keyring 205.

A couple of data including the file identifier file_id which has been encrypted and the encrypted title key eKt is then stored in a table structure provided in the MSP keyring 205.

After encryption of the file with the title key, the encrypted title key eKt in association with the file identifier file_id is stored on the MSP keyring.

Since the generation of the title key takes into account the unique identifier MC_UID of the media center 200, it is possible to identify the media center that originally generated the encryption of a given file.

Thus, with the invention, the title keys Kt are never stored anywhere as such while the encrypted title keys eKt are stored on the MSP keyring 205. These encrypted title keys eKt are generated based on parameters that are not accessible by an unauthorized user (parameters burnt in the hardware), which allows to keep them secret and not readable from outside the circuit. Therefore, fraudulent access to the files is limited.

The file decryption means 250 ensure that operation on an encrypted file stored on the media center 200 will be authorized only if the MSP keyring 205 which is connected thereto contains a valid encrypted title key, which is used as a license, enabling access and decryption of the encrypted file. It may be the same MSP keyring that was used for encryption of the file, or a different MSP keyring for which a valid encrypted title key has been generated and assigned/written to.

According to an embodiment of the invention, the MSP keyring 205 and the storage device 200 are CPRM or AACS compliant.

In this embodiment, the media Key Block MKB of the MSP keyring 205 and the Device Keys of the media center 200 are burnt at manufacturing time from CPRM information received from a 4C entity. By embedding CPRM device keys in the media center 200 and a media identifier together with CPRM media Key Block in the MSP keyring 205, the media center 200 and the MSP keyring 205 are made CPRM compliant.

The invention makes it possible to combine parameters belonging to the MSP keyring 205 and to the media center 200, for content encryption and storage of the encrypted content at the same media center 200, while storing the encryption information in the MSP keyring 205.

Figure 3:
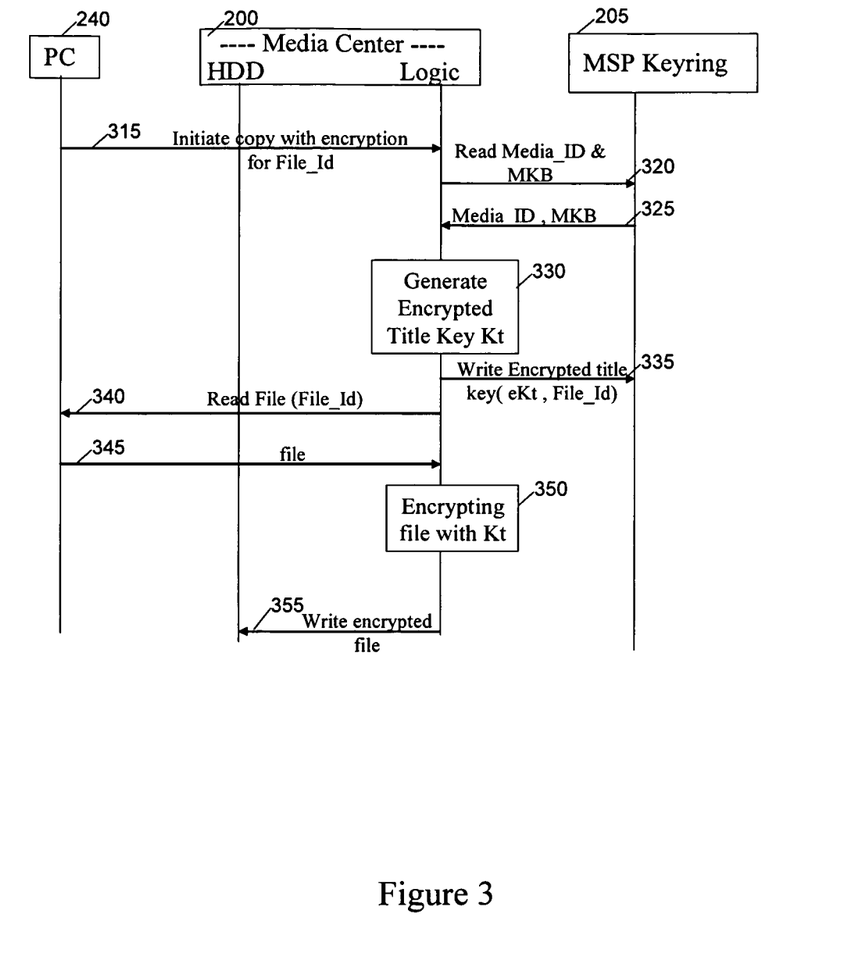
FIG. 3 illustrates the data exchanged to encrypt a file in a storage device, according to the invention.

The flowchart of FIG. 3 shows the steps performed to encrypt a file, according to the invention, before storage in the storage means 215.

At step 315, the media center 200 receives a request for initiating encryption and copy of a given file, e.g., a video file identified by a file identifier file_id. The request may be transmitted for instance through the personal computer 240 connected to the media center 200.

The media center checks whether a Mobile Secure and Protection keyring 205 is connected to the media center 200, either directly or indirectly, and if so performs the following steps.

At steps 320 and 325, the media center initiates to the MSP keyring 205 a request for reading the unique Identifier media_id and the media Key Block MKB of the MSP keyring 205. The values media_id and MKB read from the MSP keyring are used to initialize local variables with the same name.

At step 330, the media center 200 generates a random title key Kt using the unique identifier MC_UID of the media center concatenated with a locally computed random number Rnd, as defined by equation (1) of Exhibit E1.

The title key is then encrypted using the identifier media_Id of the MSP keyring 205, and an auxiliary key Km, which provides an encrypted title key eKt, as defined by equation (2) of Exhibit E1.

The title key is encrypted with an encryption function that uses a hashing of the identifier media_Id of the MSP keyring 205 concatenated with the auxiliary key Km as encryption key.

The hashing function may for instance lie on an algorithm such as the Message-Digest Algorithm MD5, or Secure Hash Algorithm SHA. In the following description, the world "hashing" will be used with a similar definition.

The auxiliary key Km is computed from the device keys DK attached to the media center 200 and from the media key block MKB attached to the MSP keyring 205.

At step 335, the encrypted title key eKt thus obtained is written to the MSP keyring in association with the corresponding file identifier File_id.

This couple of data {ekt, File_Id} forms with the MSP keyring hardware, a key that will later makes it possible to access the file identified by file_id, for example for a recording operation, as shown at steps 340 and 345.

At step 350, the file encryption means then encrypt the file using the title key Kt previously calculated. Before encryption, the file identified by the file identifier file_id is read from the personal computer. The encryption file is finally stored on the storage unit 215 at step 355.

Figure 4:
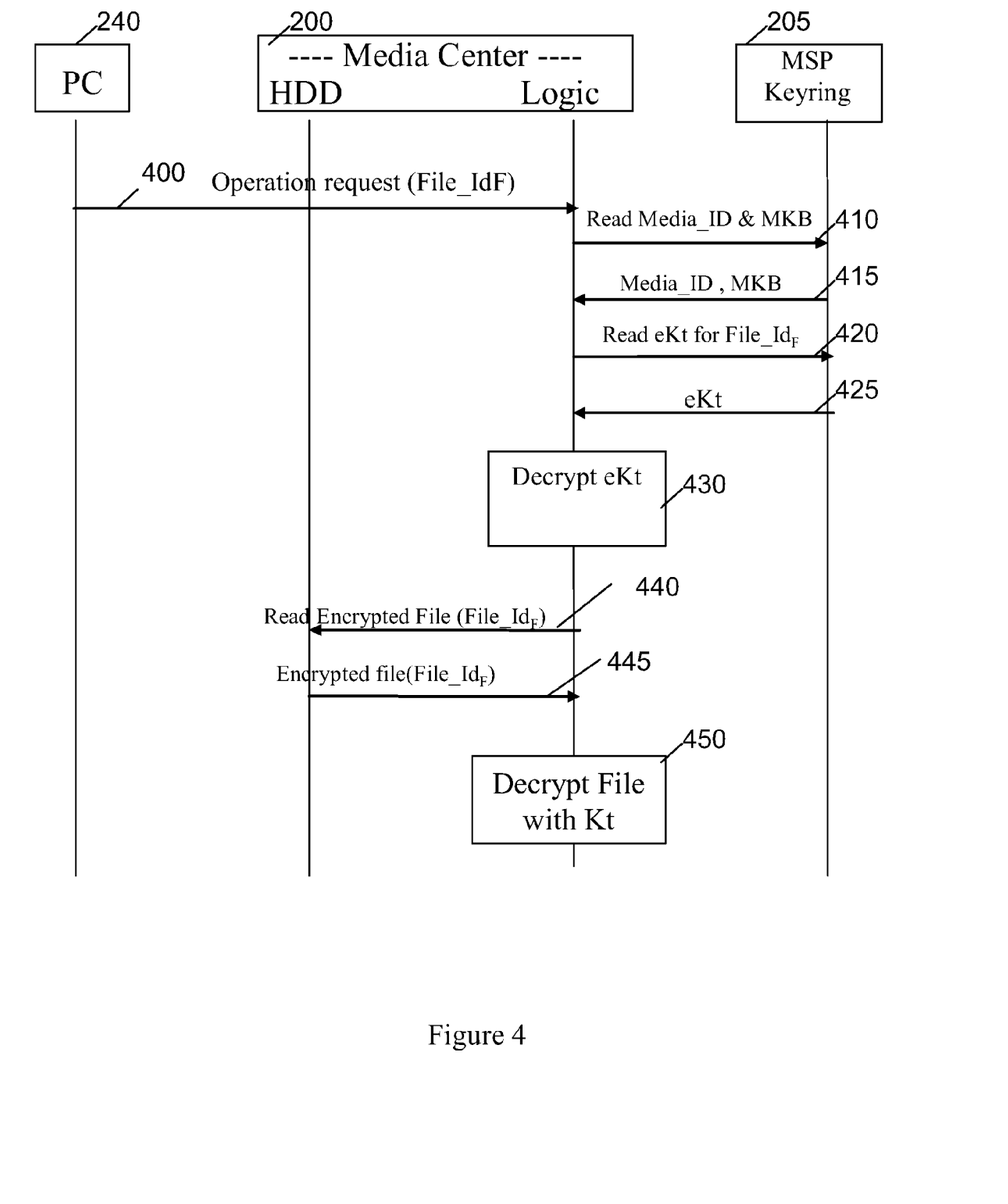
FIG. 4 illustrates the data exchanged to allow operation on an encrypted file, according to the invention.

FIG. 4 shows the steps performed by the media center 200 to retrieve an encrypted file from the storage unit 215, for example when an operation on the file, such as a playing operation, is requested.

At step 400, an operation request related to a given file F identified by a file identifier file_id$_F$ is received by the media center 200. This request may be transmitted to the media center by a user through any means such as I/R remote control, a connected PC, etc.

The media center 200 checks whether an MSP keyring 205 is inserted, and if not requests its insertion, e.g. by displaying a message on display 240.

At Step 410, the media center reads the unique media Identifier media_id and the MKB from to the MSP keyring 205. The returned values media_id and MKB are used to initialize local variables with the same name at step 415.

At step 420, the media center 200 then reads from the MSP keyring 205 the encrypted title key eKt associated with the identifier file_id$_F$ of file F. The returned encrypted title key eKt is used to initialize a local variable with the same name at step 425.

At step 430, the media center 200 decrypts the encrypted title key eKt using the values media_id and MKB.

The encrypted title key eKt is decrypted using the identifier media_id of the MSP keyring 205 and an auxiliary key Km, determined from the media Key block MKB and the device keys DK, which are unreadable externally. More specifically, the encrypted title key eKt is decrypted using a hashing of media_id concatenated with Km, which provides a title key Kt as defined by equation (3) of Exhibit E1.

At step 440, the encrypted file F is retrieved from the storage means 215 of the media center 200. The returned value is used to initialize a local variable with the same name at step 445.

At step 450, File F is decrypted using the title key Kt obtained at step 430, and then the requested operation is performed.

Figure 5A:
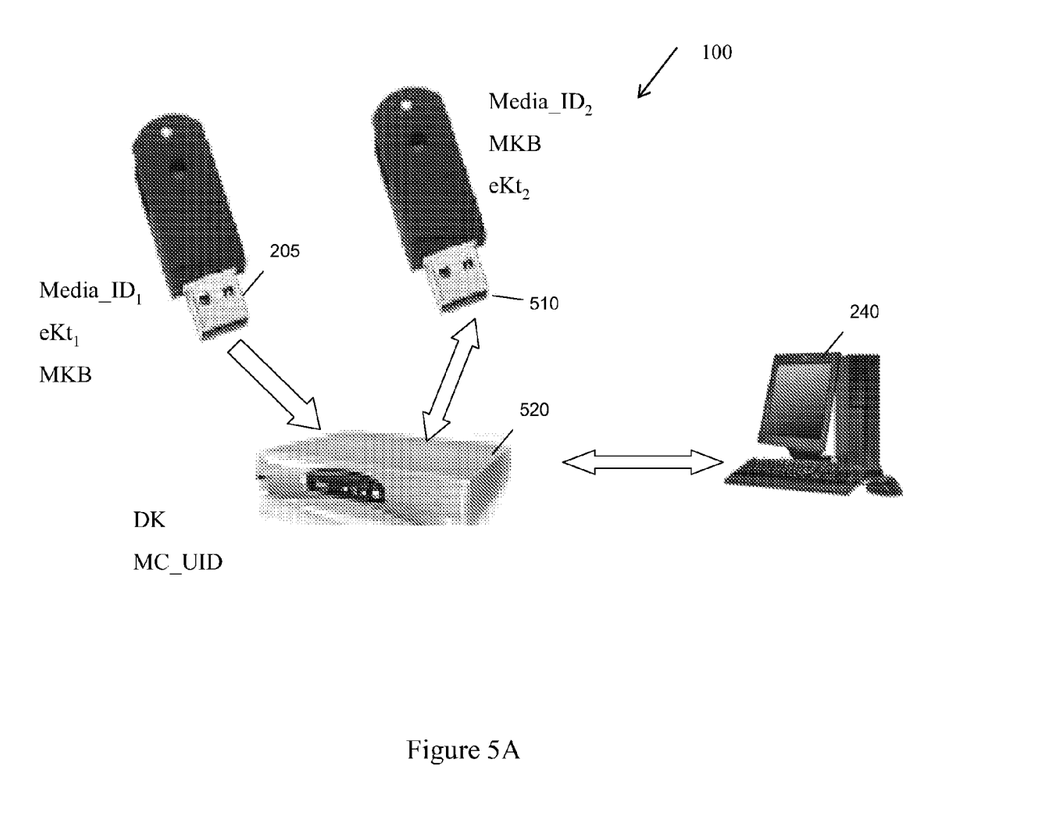
FIG. 5A shows the structure of the system according to the invention for transferring/assigning licenses from a master MSP keyring to a target MSP keyring.

Reference is now made to FIG. 5A showing the structure of the system for transfer of "licenses" from a master MSP keyring 205 to a target MSP keyring 510, according to the invention. The master MSP keyring 205 contains encrypted title keys eKt in association with respective file identifiers identifying files which have been encrypted by the media center 200, as previously described in reference to FIG. 4.

Here, the word "license" should be understood as designating a transfer key derived from an encrypted title key eKt stored in the master MSP keyring 205, that will allow a target user equipped with the target MSP keyring 510 to access a given file previously encrypted by the media center 200 using the encrypted title key.

More specifically, the media center 200 (master media center), coupled with the master MSP Keyring 205, is the sole device entitled to generate and deliver a new license for accessing a file that the master media center 200 has itself encrypted, in two different situations: to allow a user, equipped with another MSP keyring 510, to access to that encrypted file resident on the master media center 200; or to allow a user, equipped with another MSP keyring 510, to access to a copy of that encrypted file resident on a target media center 500.

In both situations, the master media center will compute a unique encrypted title key ekt as a license, for a given target MSP keyring 510, based on its unique media_Id2.

Thus, the master media center 200 generates licenses either for use on the same media center 200, for example in situations where several users provided with different MSP keyrings may need access to files stored in the same media center 200, or for use on a target media center 500 with a different MSP keyring 510, the target media center storing copies of the files encrypted by the master media center 200.

These license generation steps are independent of the actual "target" localization of the "copied" encrypted file, i.e., the media center onto which it will reside.

FIG. 5A shows the structure of the system used for the license transfer.

The master MSP keyring 205 stores encrypted title keys eKt in association with respective file identifiers, as a result of a previous encryption of the corresponding files.

The target MSP keyring 510 is the MSP keyring to which the title keys have to be copied or transferred to.

During the phase illustrated in FIG. 5A, the master MSP keyring 205 and the target MSP keyring 510 are both required to be connected to the master media center 200. Depending on the type of the master media center, the user could also use a personal computer 240 connected to the media center 200 to request transfer of licenses for a set of encrypted files.

Alternatively, the target MSP keyring 510 could be connected to another media center 510 communicating through remote communication means 520 with the master media center 200. Each license eKt generated by the master media center 200 would be first sent to the remote media center 500 and then written to the target media center 510.

Figure 6:
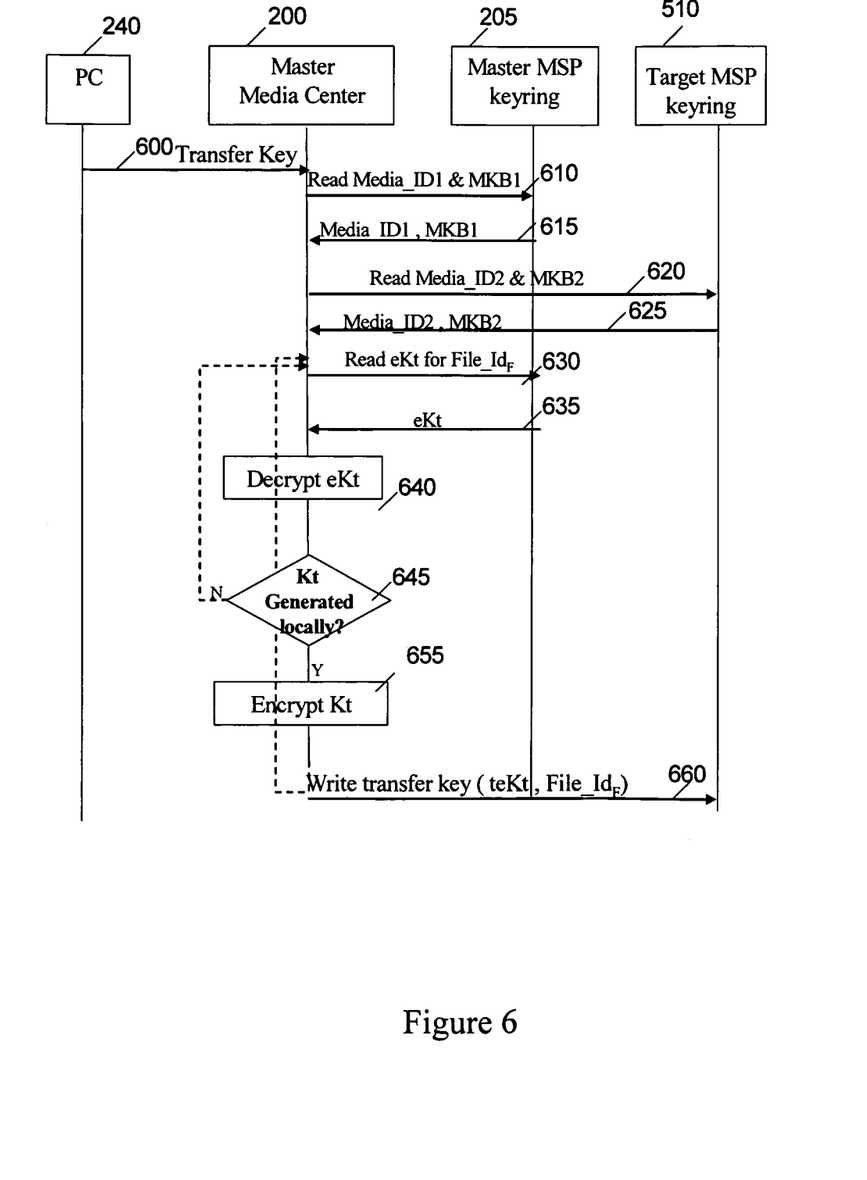
FIG. 6 illustrates the data exchanged to transfer/assign a new encrypted title key (i.e. a new license) from a master MSP keyring to a target MSP keyring.

Reference is now made to FIG. 6 showing the steps performed for transferring licenses from the master MSP keyring 205 to the target MSP keyring 510.

At step 600, a request for transfer of licenses corresponding to selected encrypted files, identified by file identifiers file_id, is received by the master media center 200, for example through the personal computer 240.

The master MSP keyring 205 contains the encrypted title keys eKt which were generated during the encryption of the selected files.

At step 610, the media center 200 reads the unique identifier media_Id1 and the media key block MKB1 of the master MSP keyring 205 and initializes local variables with the same name at step 615.

At step 620, the media center 200 reads the unique identifier media_Id2 and the media key block MKB2 of the target MSP keyring 510 and initializes local variables with the same name at step 625.

For each selected file F, identified by a file identifier file_id associated with an encrypted key eKt in the master MSP keyring 205, the media center 200 then generates a license in the form of an encrypted title key eKt, at steps 630 to 660.

More specifically, at step 630 the master media center 200 reads the encrypted title key eKt corresponding to a given selected file F identified by a file identifier File_Id$_F$ from the master MSP Keyring 205 and generates a local variable with the same name at step 635.

At step 640, the master media center 200 decrypts the encrypted title key eKt using a hashing of the identifier media_Id$_1$ of the master MSP keyring 205 concatenated with an auxiliary key Km1, according to the equation (4) of Exhibit E1.

The auxiliary key Km1 is determined from the media key block MKB1 of the master MSP keyring 205 and the device keys DK of the master media center 200. As explained above, the device keys DK may be burnt in the hardware component of the master media center 200 so as to be unreadable.

At step 645, the master media center 200 checks whether the title key was effectively generated by the master media center 200. This test consists in checking whether the lowest bits of the title key Kt, obtained at step 640 match the identifier MC_UID of the master media center 200. The lowest bits of the title key Kt correspond to the length of the identifier MC_UID of the media center.

If not, the encrypted title key Kt is not generated and the method proceeds the next encrypted title key eKt corresponding to another file, returning to step 630. If the lowest bits of the title key Kt match the identifier MC_UID of the master media center, this means that license transfer is allowed, then the master media center 200 re-encrypts the title key eKt, at step 655, using the specific media_Id of the target MSP Keyring 510 in the license generation process.

This test uses the fact that each title key Kt was initially computed at step 330 of FIG. 3 as a concatenation of a random number RND with the identifier MC_UID of the master media center as defined by equation (1) of Exhibit E1.

The test ensures protection against unauthorized copy since the transfer of an encrypted title key eKt from the master MSP keyring 205 to a the target MSP keyring 510 is only authorized if the master media center 200 from which the transfer key is to be transferred corresponds to the same media center that was used to calculate the title key Kt.

At step 655, the title key is re-encrypted using a hashing of the identifier media_Id2 of the target MSP keyring 510 concatenated with an auxiliary key Km2, which provides an encrypted temporary title key TeKt as defined by equation (5) of Exhibit E1.

The auxiliary key Km2 is determined from the media key block MKB2 of the target MSP keyring 510 and the device keys DK of the master media center 200. As explained above, the device keys DK may be burnt in the hardware component of the master media center 200 so as to be unreadable.

In an embodiment of the invention, where system 100 is CPRM or AACS compliant, Km1 and Km2 may have the same values.

At step 660, the newly encrypted title key ekt forming the license for file F is then written to the target MSP keyring 510 in association with the file identifier file_ID$_F$ of file F.

Steps 630 to 660 are repeated for all selected files until all licenses have been transferred.

The couple of information (eKt, file_id) will be stored in a table structure provided in the target MSP keyring 510.

Figure 5B:
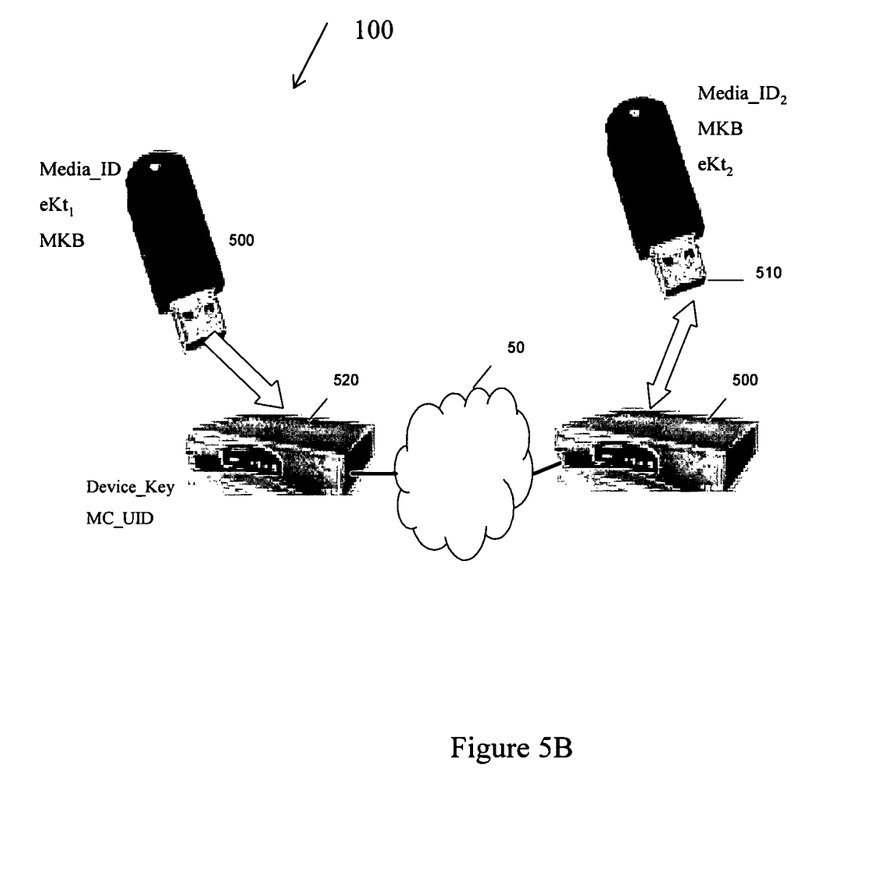
FIG. 5B shows the structure of the system according to the invention to deliver a license across the network.

In certain applications, after the transfer of the licenses, the master media center 200 may copy the encrypted files to a target media center 530 as shown in FIG. 5B.

Accordingly, the system and the method of the invention ensure protection of content stored by a user on a media center against unauthorized access and viewing and unauthorized copy.

The user only needs to be equipped with a compliant MSP keyring and to connect it to the media center. Thus there is no need for the user to remember complex password or identification information, or initiates sessions with trusted entities.

With the invention, the security data are split between the MSP keyring and the media center, which increases the level of security.

Further, a same MSP keyring can provide access to multiple media centers it the MSP keyring was used for the encryption of the content stored in these media centers.

Conversely, several MSP keyrings could be used to provide access to a same media center when suitable licenses are generated by this media center.

As the media identifier MC_UID of the media center 200 is taken into account for generating the title key, the invention makes it possible to identify/authenticate the media center that originally generated the encryption of a given file and to only authorize that media center to generate licenses for other MSP keyrings.

The invention further makes it possible to extend the conventional functions of the technology CPRM/AACS, which in the prior art were restricted to "server" applications, to the hardware level of the media center. The invention allows implementation of these functions inside the media center itself for individual use, while ensuring efficient protection.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Exhibit E1

$$K_t = Rnd(\,)\|MC\_UID \qquad (1)$$

$$eK_t = \text{encrypt}(K_t, \text{Hash}(\text{Media}\_I\|K_m)) \qquad (2)$$

$$K_t = \text{decrypt}(eK_t, \text{Hash}(\text{Media}\_ID\|K_m)) \qquad (3)$$

$$K_t = \text{decrypt}(eK_t, \text{Hash}(\text{Media}\_ID_1\|K_{m1})) \qquad (4)$$

$$eK_t = \text{encrypt}(K_t, \text{Hash}(\text{Media}\_ID_2\|K_{m2})) \qquad (5)$$

The invention claimed is:

1. A system for content protection comprising a master storage device connectable to a mobile master memory unit associated with a memory unit identifier (media_id) and with a set of memory unit keys (MKB), wherein the master storage device comprises:
   a unique device identifier identifying the master storage device (MC_UID);
   a set of protection keys (DK);
   a storage component for storing files identified by respective file identifiers; and
   a processing unit comprising a file encryption component for encrypting each file before storage in the storage component of the master storage device, using a title key (Kt) computed from the device identifier (MC_UID) of the master storage device and for encrypting the title key (Kt) using the set of protection keys (DK) of the master storage device, and the memory unit identifier (media_id) and the set of memory unit keys (MKB) of the mobile master memory unit, the master storage device being further provided to write the encrypted title key (eKt) in association with the file identifier of the file to the mobile master memory unit.

2. The system of claim 1, wherein the title key (Kt) is computed from a randomly generated number concatenated with the device identifier (MC_UID) of the master storage device.

3. The system of claim 1, wherein the title key (Kt) is encrypted using a hashing of the memory unit identifier (media_id) of the mobile master memory unit concatenated with an auxiliary key (Km).

4. The system as claimed in claim 1, wherein the processing unit further comprises a file decryption component for decrypting a given encrypted file retrieved from the storage component using the encrypted title key (eKt) associated with the file identifier identifying the given file from the mobile master memory unit.

5. The system of claim 4, wherein the file decryption component is provided to decrypt the encrypted title key (eKt) using the memory unit identifier (media_id) of the mobile master memory unit and the auxiliary key (Km), which provides the title key (Kt), the encrypted file being then decrypted using the title key (Kt).

6. The system of claim 5, wherein the encrypted title key (eKt) is decrypted using a hashing of the memory unit identifier (media_id) of the mobile master memory unit concatenated with the auxiliary key (Km), which provides the title key (Kt).

7. The system of claim 3, wherein the auxiliary key is obtained from the set of protection keys (DK) of the master storage device and the set of memory unit keys (MKB) of the mobile master memory unit.

8. The system of claim 1, wherein the set of protection keys (DK) of the master storage device is externally unreadable.

9. The system of claim 1, wherein the identifier of the mobile master memory unit is a read only unique identifier.

10. The system of claim 1, wherein the set of protection keys (DK) of the master storage device and the memory unit identifier (media_id) and the set of memory unit keys (MKB) of the mobile master memory unit are provided by a Content Protection for Recordable Media (CPRM) entity.

11. The system according to claim 1, wherein the master storage device is further connectable to a mobile target memory unit associated with a memory unit identifier (media_id2) and with a set of memory unit keys (MKB2), the processing unit of the master storage device further comprising a control component provided to generate a transfer key for a selected file among the encrypted files stored in the storage component of the master storage device, and for writing the transfer key to the mobile target memory unit, in association with the corresponding file identifier, wherein the control component includes:
 a reading function for reading from the mobile master memory unit the encrypted title key (eKt) associated with the file identifier identifying the selected file;
 a decryption function for decrypting the encrypted title key (eKt), using the memory unit identifier (media_id) of the master mobile memory unit and a first auxiliary key (Km1), which provides an intermediary title key (Kt);
 a encryption function for encrypting the intermediary title key (Kt) using the memory unit identifier (media_id2) of the mobile target memory unit, and a second auxiliary key (Km2), which provides the encrypted transfer key (eKt).

12. The system of claim 11, wherein the first auxiliary key (Km1) is obtained from the set of protection keys (DK) of the master storage device and the set of memory unit keys (MKB) of the master mobile memory unit.

13. The system of claim 11, wherein the first auxiliary key (Km1) is obtained from the set of protection keys (DK) of the master storage device and the set of memory unit keys (MKB2) of the target mobile memory unit.

14. The system of claim 11, wherein the control component include a checking function for checking whether the lowest bits of the intermediary title key match the device identifier of the master storage device before encryption by the encryption function.

15. A method for content protection, the method comprising:
 providing a master storage device comprising a storage component for storing files identified with respective file identifiers, the master storage device being provided with a unique device identifier (MC_UID) identifying the master storage device, and a set of protection keys (DK);
 providing a first connection to connect at least one mobile master memory unit associated with a memory unit identifier (media_id) and a set of memory unit keys (MKB) to the master storage device;
 in response to a reception of a file to be stored in the storage component of the master storage device, encrypting the file, using an encrypted title key (eKt), wherein a title key (Kt) is computed from the device identifier (MC_UID) of the master storage device and wherein the title key (Kt) is encrypted to provide the encrypted title key (eKt) using the set of protection keys (DK) of the master storage device, and the memory unit identifier (media_id) and the set of memory unit keys (MKB) of the mobile master memory unit;
 writing the encrypted title key in association with the file identifier of the file to the mobile master memory unit; and
 storing the encrypted files in the storage of the master storage device.

16. The method of claim 15, wherein the title key (Kt) is computed from a randomly generated number concatenated with the device identifier (MC_UID) of the master storage device.

17. The method of claim 15, further comprising providing a second connection for connecting a mobile target memory unit, associated with a memory unit identifier (media_id2) and a set of memory unit keys (MKB2), to the master storage device, the method further comprising generating a transfer key for a selected file among the encrypted files stored in the storage component of the master storage device, and for writing the transfer key to the mobile target memory unit, in association with the corresponding file identifier, wherein the generating includes:
 reading from the mobile master memory unit the encrypted title key (eKt) associated with the file identifier identifying the selected file,
 decrypting the encrypted title key (eKt), using the identifier (media_id) of the master mobile memory unit and a first auxiliary key (Km1), which provides an intermediary title key (Kt); and
 encrypting the intermediary title key (Kt) using the identifier (media_id2) of the mobile target memory unit, and a second auxiliary key (Km2), which provides the encrypted transfer key (eKt).

* * * * *